United States Patent [19]

Walton

[11] Patent Number: 4,776,419

[45] Date of Patent: Oct. 11, 1988

[54] FOUR WHEEL STEERING SYSTEM

[75] Inventor: Erlen B. Walton, Farmington Hills, Mich.

[73] Assignee: Eaton Corporation, Cleveland, Ohio

[21] Appl. No.: 138,786

[22] Filed: Dec. 28, 1987

[51] Int. Cl.$^4$ .............................................. B62D 5/08
[52] U.S. Cl. ..................................... 180/140; 180/141
[58] Field of Search ....................... 180/140, 141, 142; 280/91, 733

[56] References Cited

U.S. PATENT DOCUMENTS

| | | | |
|---|---|---|---|
| 3,292,725 | 12/1966 | Hlinsky | 180/140 |
| 4,313,514 | 2/1982 | Furukawa et al. | 180/143 |
| 4,621,702 | 11/1986 | Kanazawa et al. | 180/140 |
| 4,646,867 | 3/1987 | Kanazawa et al. | 180/140 |
| 4,666,013 | 5/1987 | Shibahata et al. | 180/141 |
| 4,671,523 | 6/1987 | Naumann | 280/91 |
| 4,697,816 | 10/1987 | Kawamoto et al. | 280/91 |

FOREIGN PATENT DOCUMENTS

| | | | |
|---|---|---|---|
| 60-146759 | 8/1985 | Japan | 180/140 |
| 61-113563 | 5/1986 | Japan | 180/140 |

OTHER PUBLICATIONS

SAE Technical Paper Series 860624—Improvement of Vehicle Dynamics by Vehicle-Speed-Sensing Four-Wheel Steering System—Yasuda, et al.

Hydronic Corporation Brochure—Remote Control Steering.

Primary Examiner—John A. Pekar
Attorney, Agent, or Firm—P. S. Rulon

[57] ABSTRACT

A closed hydraulic system (22) is provided for transmitting steering movement to servo valve (24) of a rear wheel power steering assembly (26) in response to a steering movement of a front wheel steering assembly (14). The front wheel steering assembly is controlled by a steering wheel (18) and a power steering assembly (20). The closed hydraulic system (22) includes a pump assembly (50) and an actuator assembly (96) connected together by conduits (54,56) to define closed fluid flow branches or fluid links (112,114) for moving a piston (98) in the actuator assembly in response to movement of a piston (78) the pump assembly. Movement of the actuator piston is transmitted to a valving member (106) of the servo valve via a cam assembly (104) which moves the valving member (106) to effect same direction rear wheel steering for rather small front wheel steering angles and to effect opposite direction rear wheel steering for greater front wheel steering angles. System (22) may include a reservoir assembly (66) including a piston assembly (124) for maintaining a constant positive pressure in both branches, a dash pot (124) for preventing sudden steering angle charges of the rear wheels in the event of rapid fluid loss in either branch, and check valve assemblies (134) for limiting the maximum pressure differential between the branches.

7 Claims, 5 Drawing Sheets

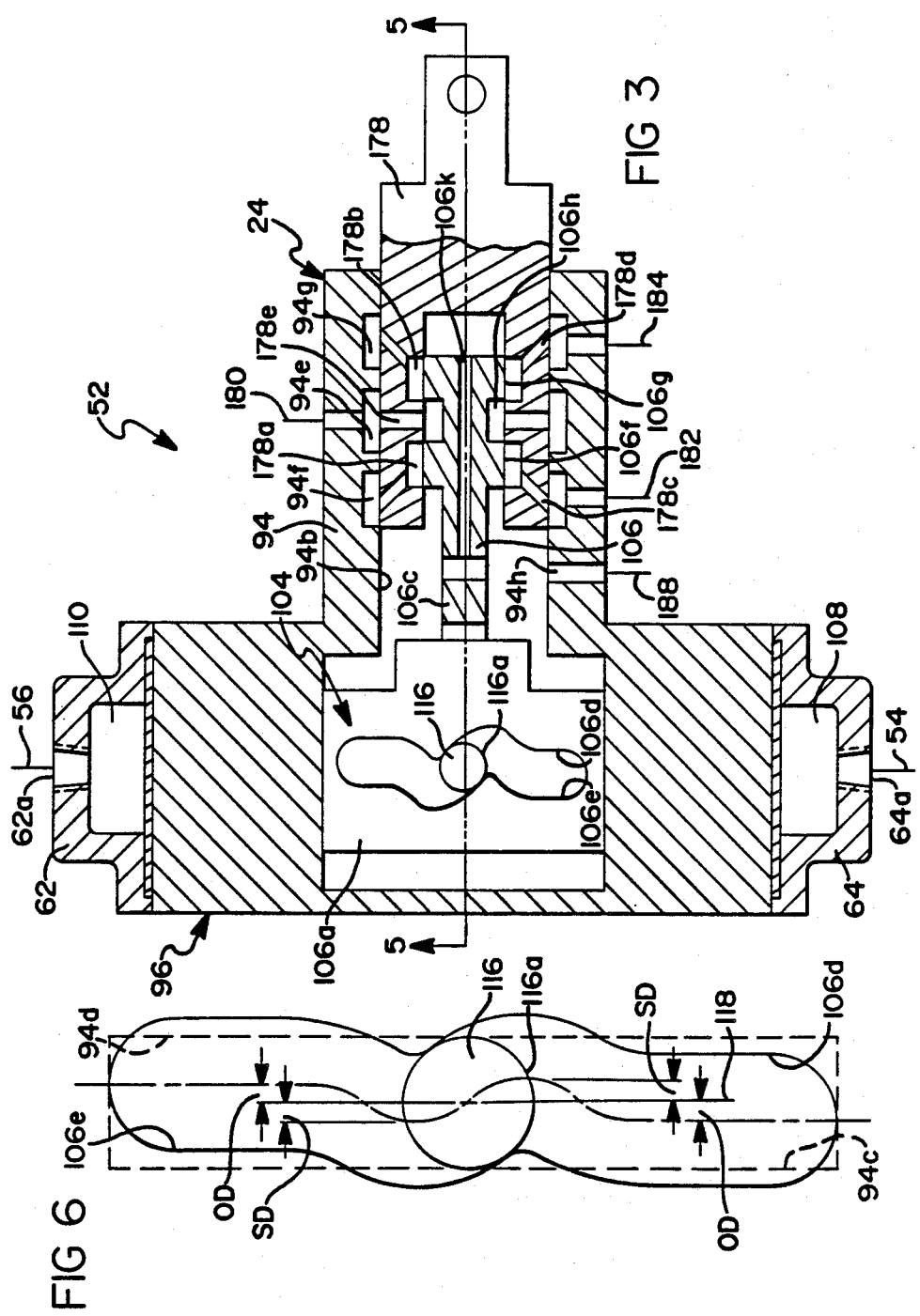

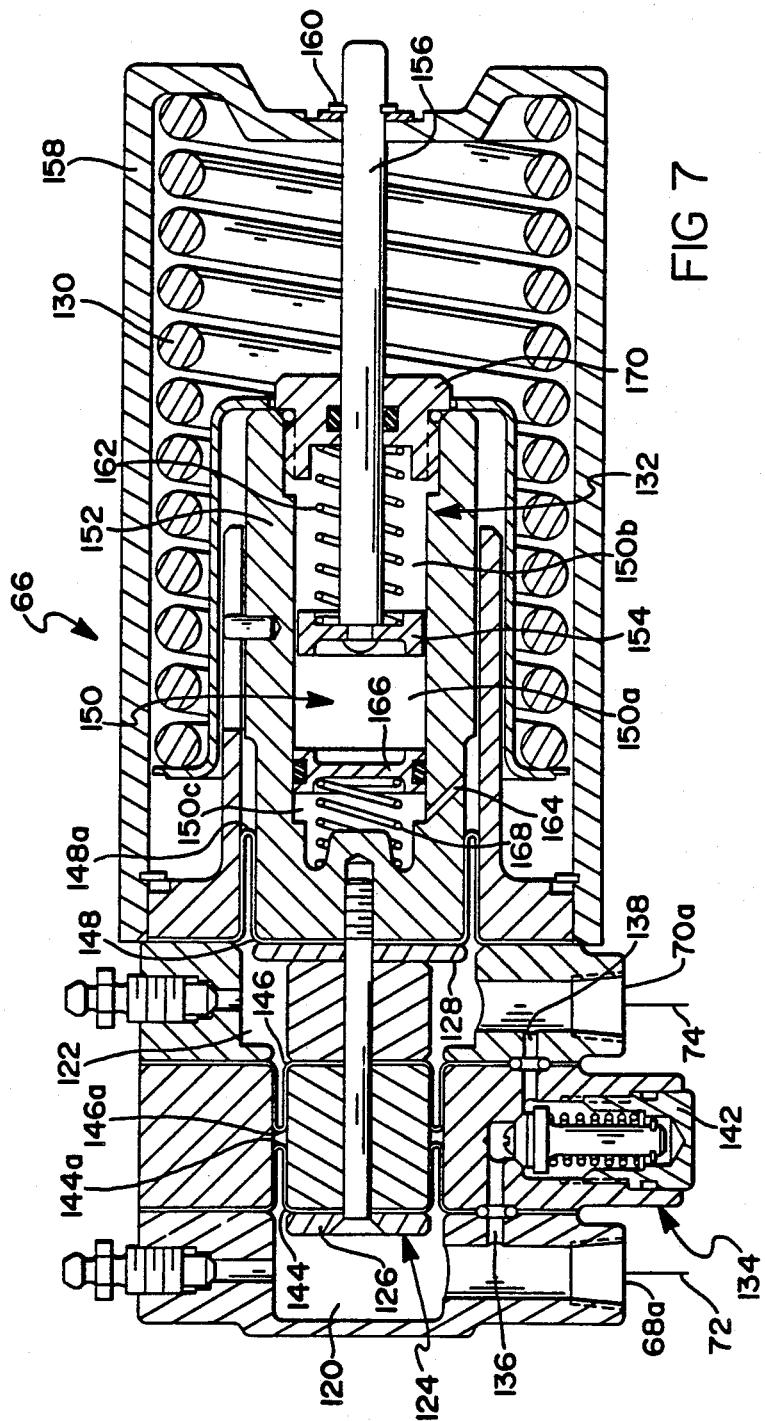

FOUR WHEEL STEERING SYSTEM

FIELD OF INVENTION

The present invention relates to four wheel steering. More specifically, the invention relates to apparatus for transmitting steering movement to a rear wheel steering assembly of a vehicle in response to steering movement of a front wheel steering assembly.

DESCRIPTION OF THE PRIOR ART

The purpose of four wheel steering is of course to reduce vehicle turning radius and/or to improve high speed performance of the vehicle. It is known to employ electrical, electrohydraulic, hydromechanical, or mechanical apparatus to transmit steering movement to rear wheel steering assemblies of vehicles in response to steering movement of front wheel steering assemblies. In practice, implementation of such apparatus has been expensive, has been somewhat unreliable, and/or has provided less than optimum performance. Further, hydromechanical and mechanical apparatus have been difficult to package into available vehicle space and have been difficult to protect against the harsh environment in which vehicles operate.

In a known four wheel steering system, steering movement of a front wheel steering assembly is transmitted to a rear wheel steering assembly via a mechanical apparatus in the form of a rotatably mounted shaft means extending longitudinally of the vehicle between the front and rear wheel steering assemblies. The rotatably mounted shaft means senses steering movement of the front wheel steering assembly and also transmits power for steering the rear wheel steering assembly. It is also known to convert this mechanical apparatus to a hydromechanical apparatus by connecting the output of the rotatably mounted shaft to a valve which ports pressurized hydraulic fluid from a motor driven pump to a power cylinder operative to transmit steering movement to the rear wheel steering assembly. It is also known to provide such mechanical and hydromechanical apparatus with a geared transmission operative to reverse the output direction of the rotatably mounted shaft means when the steering angle of the front wheel steering assembly exceeds a predetermined amount, thereby changing the steering direction of the rear wheels relative to the front wheels from the same direction to opposite direction.

SUMMARY OF THE INVENTION

An object of this invention is to provide inexpensive and reliable apparatus for transmitting steering movement to a rear wheel steering assembly.

Another object of this invention is to provide such an apparatus which is also readily packaged into available space of vehicles.

Another object of this invention is to provide simple, inexpensive, and reliable means for reversing the steering angle of the rear wheels when the steering angle of the front wheels exceeds a predetermined angle.

According to a feature of the invention, a wheeled vehicle steering system comprises first means for transmitting steering movement of a steering wheel to a front wheel steering assembly; second means for transmitting steering movement to a rear wheel steering assembly in response to steering movement of the front wheel steering assembly. The second means comprises a hydraulic system including first and second closed fluid flow branches, one end of each branch defined by first and second pumping volumes of a pump having pumping means mechanically moved in response to steering movement of front wheel steering assembly, the pumping means operative to effect fluid flow in said branches by inversely varying the volumes of the pumping volumes, the other end of each closed branch defined by first and second actuating volumes of an actuator having actuating means moved in response to the fluid flow, the actuating means operative when moved to inversely vary the volumes of the actuating volumes and the actuating means operative when moved to effect steering movement of the rear wheel steering assembly.

BRIEF DESCRIPTION OF THE INVENTION

A steering system according to the present invention is shown in the accompanying drawings in which:

FIGS. 2-7 are detailed views of components of the apparatus; and

DETAILED DESCRIPTION OF THE DRAWINGS

Figure 1:
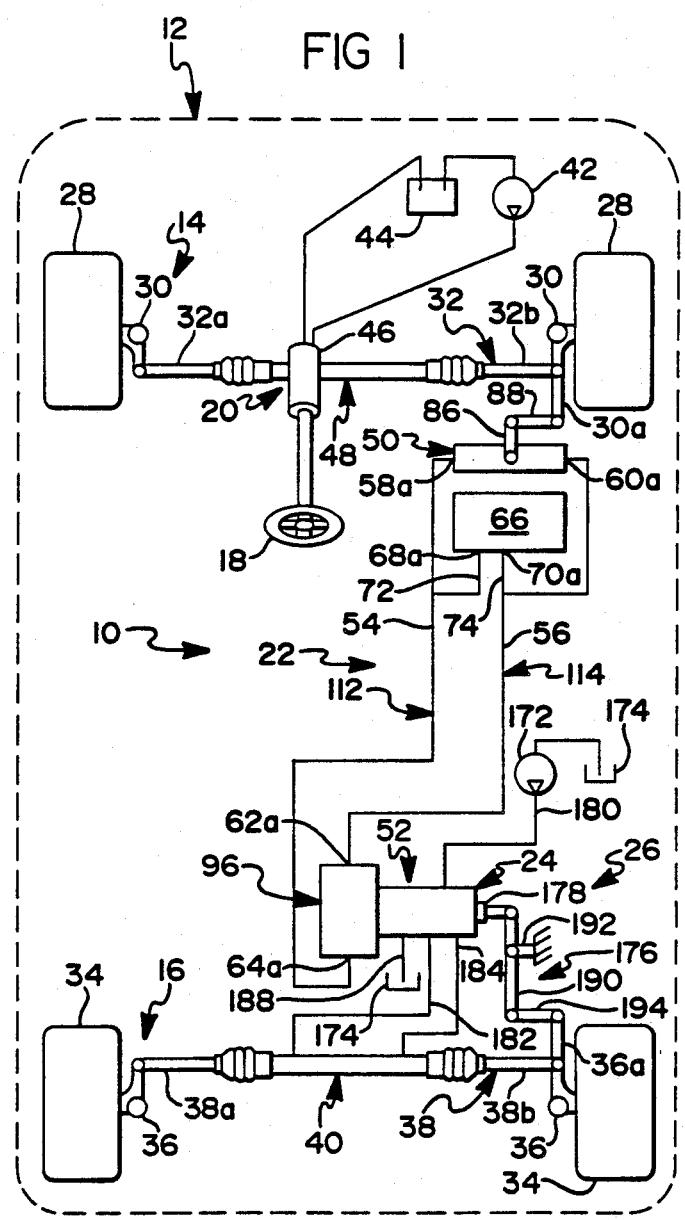
FIG. 1 is a schematic plan view of a steering system of the invention disposed between front and rear wheel steering assemblies of a vehicle.

The schematic plan view of FIG. 1 illustrates a steering system 10 for a wheeled vehicle having a body represented by phantom line 12, and front and rear steerable wheel assemblies 14, 16. The system includes a steering wheel 18, a power steering assembly or first means 20 for transmitting steering movement of the steering wheel to the front wheel steering assembly, and a closed hydraulic system or second means 22 for transmitting steering movement of the front wheel steering assembly to a servo valve assembly 24 of a rear wheel power steering assembly 26 which is operative to transmit steering movement to the rear wheel steering assembly.

The front wheel steering assembly 14 includes front wheels 28 each having a steering knuckle arm 30 pivotally connected together by tie rod ends 32a, 32b of a tie rod or ram 32 disposed for to-and-fro movement transverse to the longitudinal direction of the vehicle in known manner. The tie rod or ram 32 forms part of apparatus 20 and is discussed further hereinafter. The rear wheel steering assembly 16 includes rear wheels 34 each having a steering knuckle arm 36 pivotally connected together by tie rod ends 38a, 38b of a tie rod or ram 38 disposed for to-and-fro movement transverse to the longitudinal direction of the vehicle. Tie rod or ram 38 forms part of a power cylinder 40 and is discussed further hereinafter.

Assembly 20 may be any of several well known mechanical non-power or power steering assemblies which transmit steering movement to front wheel steering assembly in response to steering movement of a steering wheel. Apparatus 20 is preferably of the power steering type and, as illustrated therein, is of the well known hydraulic type including a source of pressurized hydraulic oil or fluid provided by a pump 42 in known manner, a sump 44, and a servo valve 46 for connecting or communicating the source and sump with opposite sides of an unshown piston disposed in a power cylinder 48. Tie rod ends 32a, 32b extend from opposite sides of the pistons and move together in to-and-fro motion in response to alternate porting or communication of opposite sides of the unshown power cylinder piston with the source and sump by valve 46.

Figure 2:
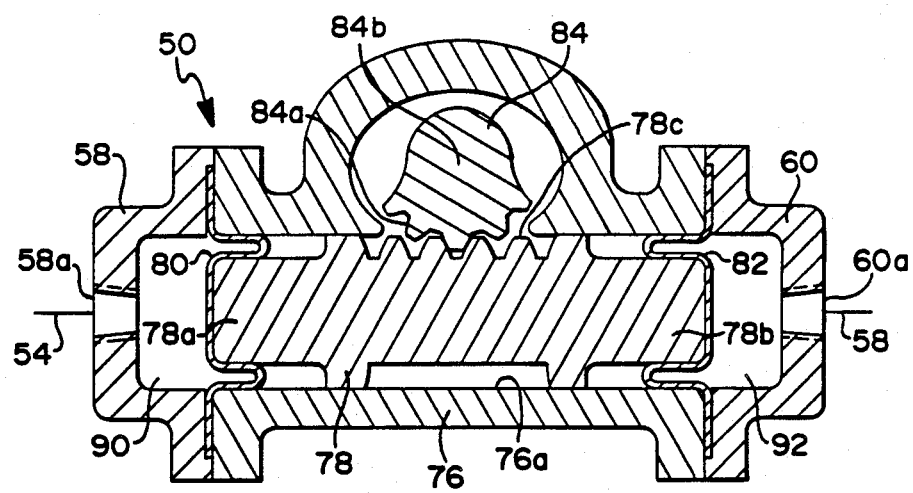

Closed hydraulic system 22 includes a pump assembly 50 (see FIGS. 1, 2), an actuator-valve assembly 52 (see FIGS. 1-6), and conduits or passages 54, 56 respectively connected at one end to ports 58a, 60a defined by end caps 58, 60 of the pump assembly and respectively connected at the other end to ports 62a, 64a defined by end caps 62, 64 of the actuator-valve assembly. System 22 may also include a closed reservoir assembly 66 having ports 68a, 70a respectively connected to conduits 54, 56 by conduits or passages 72, 74.

Pump assembly 50 includes a cylinder portion or center housing member 76 defining a cylindrical bore 76a, a piston member or fluid displacement means 78 slidably disposed in the bore and having oppositely facing ends 78a, 78b supporting roll type diaphragms 80, 82, the end caps 58, 60, and a pinion 84 having teeth 84a in mesh with rack teeth 78c defined by piston 78. Pinion 84 is supported for rotation by housing member 76 in a conventional manner and is rotated about its axis 84b in response to steering movement of the front wheel steering assembly by a linkage assembly. The linkage assembly includes a rigid extension 30a of steering knuckle arm 30, an arm 86 non-rotatably fixed at one end to pinion 84, and a link 88 pivotally connected at its opposite ends to extension 30a and arm 86. Diaphragms 80, 82 are sealingly sandwiched between the housing and end caps to define volumes 90, 92. The end caps are secured to the housing in known manner, e.g., by unshown screws. Volumes 90, 92 vary inversely in volume in response to sliding movement of the piston due to rotation of pinion 84. Diaphragms 80, 82 hermetically seal the volumes at piston ends 78a, 78b and, combination with piston 78, provide a movable partition sealingly separating the volumes against fluid communication therebetween.

Actuator-valve assembly 52 includes a housing assembly shown herein for illustration purposes as a one piece housing member 94 containing an actuator assembly 96 forming part of the closed hydraulic system and the servo valve assembly 24 of the rear wheel power steering assembly 26. The actuator assembly includes a bore 94a disposed at right angles to a bore 94b of the servo valve assembly, a piston or fluid displacement means 98 slidably disposed in bore 94a, roll type diaphragms 100, 102 supported by oppositely facing ends 98a, 98b of the piston, the end caps 62, 64, and a cam assembly 104 for moving a spool valving member 106. In a manner analogous to pump 50, diaphragms 100, 102 are sealingly sandwiched between the housing and end caps 62, 64 to define volumes 108, 110 which vary inversely in volume in response to sliding movement of piston 98. More specifically, volumes 108, 110 vary inversely in volume in response to sliding movement of pump piston 78 and thereby effect sliding movement of piston 98. The diaphragms also hermetically seal the volumes at the piston ends 98a, 98b and, in combination with piston 98, provide a movable partition sealingly separating volumes 108, 110 against fluid communication therebetween.

As thus far described, conduits 54, 56, pump volume 90, 92, and actuator volumes 108, 110 define first and second closed fluid flow branches or closed fluid links 112, 114 between the pump and actuator pistons. The branches are filed with a noncompressible oil. Hence, sliding movement of pump piston 78 in response to steering movement of the front wheel steering assembly causes fluid flow in both branches and a corresponding sliding movement of actuator piston 98. The piston moves the same amount when the displacement surface areas of their piston ends and diaphragms are the same.

Spool valving member 106, which is explained further hereinafter with respect to rear wheel power steering assembly 26, includes a forked end portion having slab like tangs 106a, 106b connected to the valving member by a stem portion 106c. The tangs are supported for sliding movement normal to bore 94a and along the axis of bore 94b by spaced apart wall surfaces of the housing assembly. Alternatively, the wall surfaces may support bearings for reducing friction. Valving member 10 is moved rightward to effect leftward or counterclockwise steering movement of rear wheels 34 and is moved leftward to effect rightward or clockwise steering movement of the rear wheels.

Cam assembly 104 includes identical curved cam slots defined by oppositely facing curved cam surfaces or profiles 106d, 106e formed in each tang, identical straight cam slots defined by straight cam surfaces or profiles 94c, 94d positioned parallel to the axis of bore 94a, and formed in the housing assembly, and cam followers 116 extending radially in opposite direction from piston 98. Each follower 116 has an outer cylindrical surface 116a of diameter slightly less than the width of the cam slots to allow movement of the followers in the slots and to limit free play. The outer cylindrical surface of each follower may be supported by an unshown anti-friction bearing to reduce friction.

One of the curved cam slots in shown enlarged in the partial view of FIG. 6 with the associated straight slot projected thereon in phantom line. A line 118 in FIG. 6 represents the longitudinal center of the straight slot. Dimensions SD and OD represent maximum same direction and opposite direction steering angles effectable by cam assembly 104 movement of valving member 106 when followers 116 are moved in either direction from their shown neutral position corresponding to straight ahead steering of the front and rear wheels.

In the disclosed embodiment, the profiles of curved cam slots 106d, 106e are selected to first move spool member 106 in directions effecting same direction steering of the front and rear wheels and then opposite direction steering in response to increased front wheel steering angles. By way of example, maximum same and opposite direction steering angles are 2 degrees for the disclosed embodiment. However, as may be seen, the profiles are readily changed to provide different same and opposite direction steering angles. Further, the profiles of the curved cam surfaces may be selected to cause only same direction steering, opposite direction steering, and/or steering angles that are not the same for left and right turns. Alternatively, cam assembly 104 may be disposed between front wheel steering assembly 14 and pump piston 78 and valving member 106 may be moved in direct response to movement of actuator piston 98, whereby fluid displacement in closed branches 112, 114 and movement of actuator piston 98 will vary according to curved cam profiles 106d, 106e.

Looking now at FIG. 7, closed hydraulic system 22 is preferably provided with reservoir assembly 66 which includes closed reservoir chambers 120, 122 respectively communicating with conduits 54, 56 via conduit 72, 74, a piston assembly 124 having circular and annular surfaces 126, 128 facing axially in the same direction and of substantially equal effective area acting on the fluid in chambers 120, 122, a spring 130 biasing the surface areas in direction tending to decrease the volumes of the chambers and therefore applying substantially equal precharge pressures to both branches when no external forces are acting on the pump and/or actuator pistons, and a damper or dash pot like assembly 132 for limiting the rate of movement of piston assembly 124. The purpose of dash pot assembly 132 is to prevent rapid change in the rear wheel steering angle in the event of rapid fluid loss in either of the branches. For convenience sake, the reservoir has incorporated therein two relief valve assemblies 134; only one assembly is shown. The valves assemblies relieve excess differential pressure between the branches to prevent loss of front wheel steering control due to excessively high pressure in the closed hydraulic system; such pressure could be caused by seizure of movable components associated with the closed hydraulic system. The valve assemblies differ mainly with respect to the position of passages 136, 138, i.e., the passages for the shown valve are positioned to effect high pressure relief in branch 112 and the passages for the unshown valve are positioned to effect high pressure relief in branch 114. At least one of the valve assemblies includes a threaded member 142 which may be threadably backed out to allow free fluid flow between the branches for repositioning the pump and/or actuator pistons to their neutral positions after correction of a over pressure condition.

The reservoir chambers 120, 122 are hermetically sealed by three roll type diaphragms 144, 146, 148 in a manner analogous to the diaphragms in pump and actuator assemblies 50, 96. The effective surface areas of the circular and annular piston surface areas 126, 128 is substantially determined by the diametrical distance between the midpoints 144a, 146a, 148a of the folds of the respective diaphragms. For circular piston surface 126 the effective surface area is determined merely by the diametrical distance between the fold midpoints 144a. For annular piston surface 128 the effective surface area is determined by the difference of the diametrical distances between the midpoints 148a, 146a of diaphragms 148, 146. Dash pot assembly 132 includes a cylindrical chamber 150 formed in a member 152 of the piston assembly, a loosely fitting piston 154 dividing the chamber into subchambers 150a, 150b, a rod 156 fixed at one end to piston 154 and secured to a housing member 158 by a snap ring 160 which limits leftward movement of the piston relative to the housing member, a spring 162 biases the piston and rod leftward, and a third subchamber 150c vented to ambient by a passage 164 and sealed from subchamber 150a by a slidable piston 166 biased rightward by a spring 168. Chambers 150a, 150b are filed with a non-compressible viscous fluid such as silicone fluid which extrudes through a restriction defined by the space between piston 154 and the cylinder wall to prevent rapid leftward movement of piston assembly 124. Subchamber 150c facilitates silicone fluid displacement when an end cap 170 is threaded into the open end of cylindrical chamber 150. Subchamber 150c also accommodates thermal expansion of the silicone fluid.

Figure 8:
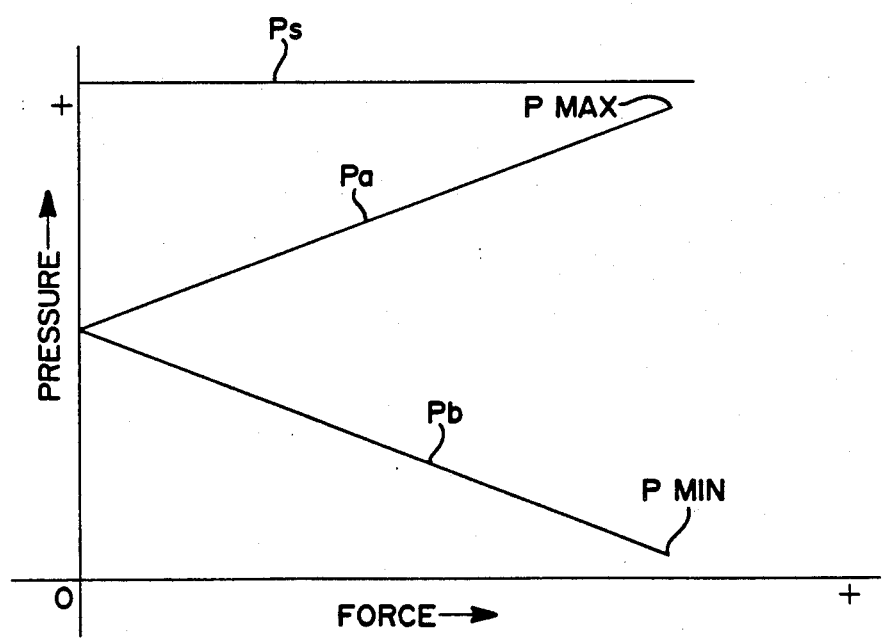
FIG. 8 is a graph of hydraulic system pressure in the system.
Figure 4:
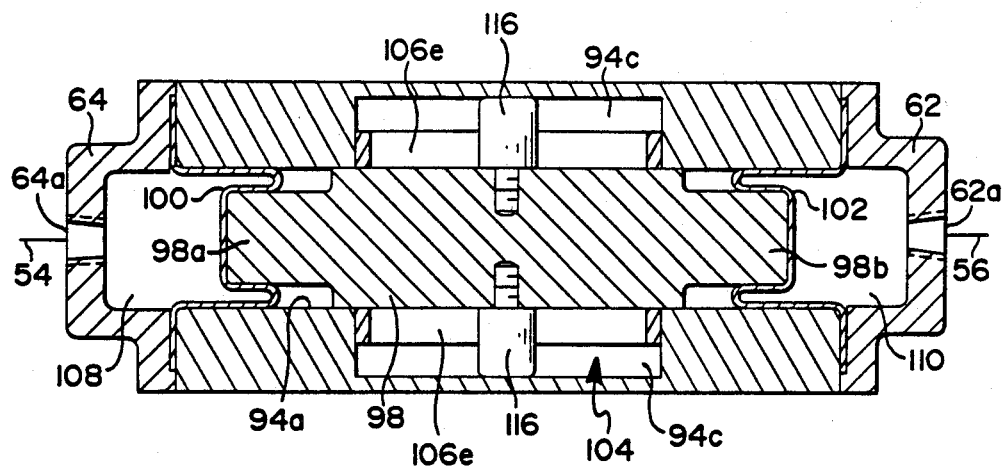
Figure 5:
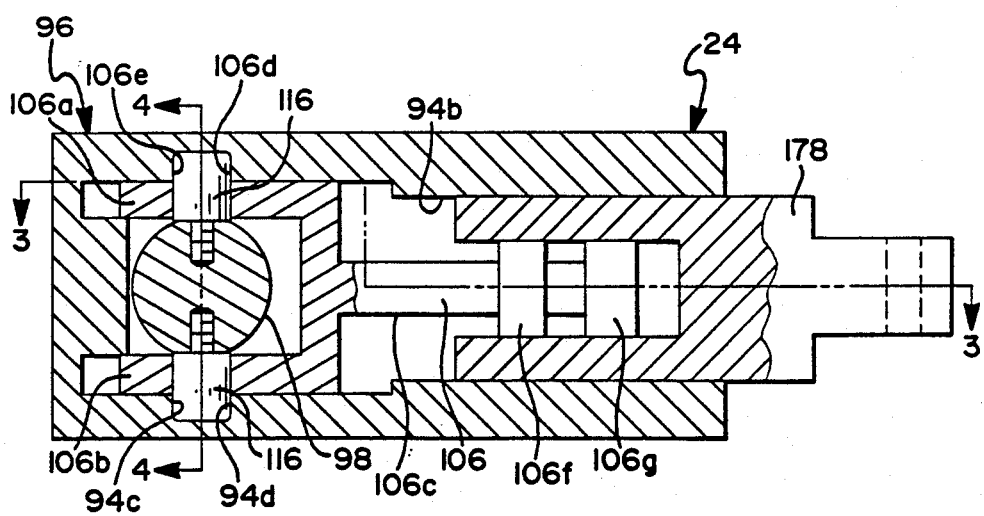

The biasing force of reservoir spring 130, acting on the hydraulic oil in branches 112, 114 via piston surface areas 126, 128, maintains the sum of the fluid pressure in the branches substantially constant during non-operational and operational modes of the closed hydraulic system. The graph of FIG. 8 illustrates the hydraulic pressure characteristics in branches 112, 114 as external forces acting on pump and actuator pistons 78, 98 increase from zero. A curve $P_a$ represents the pressure in one branch, a curve $P_b$ represents the pressure in the other branch, and a constant pressure curve $P_s$ represents the sum of the pressures in both branches during all modes of operation. As the pressure in one branch increases the pressure in the other branch decreases.

As previously mentioned, one purpose of relief valve assemblies 134 is to prevent loss of front wheel steering control due to excessively high pressures in the closed hydraulic system. Another purpose for the relief valves is to maintain a positive fluid pressure in both branches, thereby preventing reverse flexing of the roll type diaphragms in the pump, actuator and reservoir assemblies. The positive pressure is maintained by setting $P_{max}$ of both valves to a pressure less than $P_s$, thereby ensuring that $P_{min}$ is always positive since $P_{max} + P_{min} = P_a + P_b = P_s$ and since $P_{max} < P_s$.

The positive pressure provides a no backlash fluid link between the pump and actuator pistons regardless of the length of the path of the conduits interconnecting the pump and actuator. Further, the fluid link requires no adjustment during initial installation or subsequent repairs and also maintains precise positional relationship between the pump and actuator pistons independent of temperature changes.

Rear wheel power steering assembly 26 includes a source of pressurized hydraulic oil or fluid provided by a pump 172, a sump or sumps 174, the servo valve assembly 24 for connecting or communicating the source and sumps with opposite sides of an unshown piston disposed in the power cylinder 40, and a feedback mechanism 176 for the servo valve. Pump 42 and sump 44 may be common to both power steering assemblies in lieu of separate pump 172 and sumps 174. Servo valve assembly 24 and feedback mechanism may take the form of many such well known assemblies and mechanisms.

Feedback mechanism 176 includes a rigid extension 36a of steering knuckle arm 36, a fulcrum arm 190 pivoted about a grounded member 192, a link 194 pivotally connected at its opposite ends to extension 36a and one end of the fulcrum arm. The other end of the fulcrum arm is connected to cylindrical valving member 178 of servo valve assembly 24.

Servo valve assembly 24 includes the cylindrical valving member 178 having an outer surface slidably disposed in bore 94b of housing 94 and an inner surface slidably receiving lands 106f, 106g of valving member 106. Bore 94b includes an annular recess 94e connected to pressurized oil from pump 172 via a conduit 180, annular recesses 94f, 94g respectively connected to opposite sides of the unshown piston in power cylinder 40 via conduits 182, 184, and a passage 94h connected to sump 174 via a conduit 188. Cylindrical valving member 178 includes annular recesses 178a, 178b respectively in continuous communication with recesses 94f, 94g via a plurality of diagonally extending passages 178c, 178d and a plurality of radially extending passages 178e continuously communicating pressurized oil in recess 94e with an annular recess 106h between lands 106f, 106g. The right end of valving member 106 is communicated with the sump via a longitudinally extending passage 106k. Annular lands 106f, 106g are slightly wider than annular recesses 178a, 178b.

Servo valve 24 and feedback mechanism 176 operate in well known manner. For the disclosed embodiment, a given leftward or rightward movement of valving member lands 106f, 106g effects fluid communication to change the steering angle of the rear wheels. As the rear wheel steering angle changes, the feedback mechanism effects a corresponding sliding movement of cylindrical valving member 178 for blocking further fluid communication when the steering angle has changed in proportion to the amount of movement of valving member lands 106f, 106g. For example, rightward movement of valving member lands 106f, 106g facilitates a leftward turning angle change of the rear wheels by communicating pressurized oil in recess 106h to the right side of the unshown piston in power cylinder 40 via annular recesses 178b, 94g and conduit 184, and by communicating the left side of the power cylinder piston with sump 174 via conduit 182, annular recesses 94f, 178a passage 94h, and conduit 188. The leftward turning angle change pivots fulcrum arm 190 clockwise, thereby moving valving member recesses 178a, 178b back into sealing relation with lands 106f, 106g. Operation in response to leftward movement of valving member lands 106f, 106g is merely the reverse of the above.

A preferred embodiment of the invention has been disclosed for illustrative purposes. Many variations and modifications of the disclosed embodiment are believed to be within the spirit of the invention. The following claims are intended to cover the inventive portions of the disclosed embodiment, variations and modifications believed to be within the spirit of the invention.

What is claimed is:

1. A steering assembly for a wheeled vehicle having front and rear dirigible wheel assemblies, the assembly comprising:
   first means for transmitting steering movement of a steering wheel to a front wheel steering assembly;
   second means for transmitting steering movement to a rear wheel steering assembly in response to steering movement of the front wheel steering assembly, the second means comprising a first hydraulic system including a hydraulic actuator operative to mechanically transmit the steering movement to the rear wheel assembly in a direction controlled by a valve assembly having a movable valving member selectively operative to connect opposite sides of a piston in the actuator with a source of pressurized fluid and a sump which supplies nonpressurized fluid to the source; the improvement wherein the second means further comprises:
   a second hydraulic system including first and second closed fluid flow branches, a pump device connected to one end of each closed branch for effecting to-and-fro fluid flow in the closed branches in response to to-and-fro steering movement of the front wheel steering assembly, and an actuator device connected to the other end of each closed branch for effecting movement of the valving member in the valve assembly of the first hydraulic system.

2. The steering assembly of claim 1, wherein said pump device includes movable means mechanically connected to the front wheel steering assembly by drive means and moved thereby to effect said fluid flow; said actuator device includes movable means mechanically connected to the valving member by drive means and moved in response to said fluid flow; and said steering system further including:
   a cam assembly drivingly interposed between one of said movable means and the associated drive means.

3. The steering assembly of claim 1, further including:
   a cam assembly disposed between the actuator device of said second hydraulic system and the valving member of said valve assembly of said first hydraulic system for controlling the direction and amount of movement the valving member according to the profile of the cam assembly.

4. The steering assembly of claim 3, wherein the profile of said cam assembly moves the valving member in a direction effecting steering movement of the rear wheel steering assembly in the same direction as the steering direction of the front wheel steering assembly for front wheel steering angles below a predetermined amount and in opposite directions as the steering direction of the front wheel assembly for front wheel steering angles greater than the predetermined amount.

5. The steering assembly of claim 4, wherein the cam assembly includes first cam means mechanically driven by the actuator device, and a second cam means driven by the first cam means and mechanically driving the valving member.

6. A steering assembly for a wheeled vehicle having front and rear dirigible wheel assemblies, the assembly comprising:
   first means for transmitting steering movement of a steering wheel to a front wheel steering assembly;
   second means for transmitting steering movement to a rear wheel steering assembly in response to steering movement of the front wheel assembly, the second means comprising a first hydraulic system including a hydraulic actuator operative to mechanically transmit the steering movement to the rear wheel steering assembly in a direction controlled by a valve assembly having a movable valving member operative to alternately connect opposite sides of a piston in the actuator with a source of pressurized fluid and a sump supplying nonpressurized fluid to the source; the improvement wherein the second means further comprises:
   a second hydraulic system including first and second closed fluid flow branches of substantially fixed volume, a first device connected to one end of each closed branch for effecting to-and-fro fluid flow in the closed branches in response to to-and-fro steering movement of the front wheel steering assembly, a second device connected to the other end of each closed branch for effecting movement of the valving member in the valve assembly of the first hydraulic system.

7. The steering assembly of claim 6, wherein said pump device includes movable means mechanically connected to the front wheel steering assembly by drive means and moved thereby to effect said fluid flow; said actuator device includes movable means mechanically connected to the valving member by drive means and moved in response to said fluid flow; and said steering system further including:
   a cam assembly drivingly interposed between one of said movable means and the associated drive means.

* * * * *